US012609640B2

(12) United States Patent
Lu et al.

(10) Patent No.: US 12,609,640 B2
(45) Date of Patent: Apr. 21, 2026

(54) POWER TOOL

(71) Applicant: Nanjing Chervon Industry Co., Ltd., Nanjing (CN)

(72) Inventors: Wenjing Lu, Nanjing (CN); Yanqing Xu, Nanjing (CN); Guang Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 371 days.

(21) Appl. No.: 18/338,896

(22) Filed: Jun. 21, 2023

(65) Prior Publication Data

US 2024/0128897 A1     Apr. 18, 2024

(30) Foreign Application Priority Data

Jul. 15, 2022    (CN) .......................... 202210830212.7

(51) Int. Cl.
| | |
|---|---|
| *H02P 3/18* | (2006.01) |
| *H02P 25/022* | (2016.01) |
| *H02P 27/08* | (2006.01) |
| *B25F 5/02* | (2006.01) |

(52) U.S. Cl.
CPC .............. *H02P 3/18* (2013.01); *H02P 25/022* (2013.01); *H02P 27/08* (2013.01); *B25F 5/02* (2013.01)

(58) Field of Classification Search
CPC .......... H02P 3/18; H02P 27/08; H02P 25/022; B25F 5/02
See application file for complete search history.

(56) References Cited

U.S. PATENT DOCUMENTS

| | | | | |
|---|---|---|---|---|
| 6,121,740 | A * | 9/2000 | Gale | ...................... B60L 53/20 |
| | | | | 318/362 |
| 9,281,772 | B2 * | 3/2016 | Wang | ...................... H02P 21/12 |
| 10,763,769 | B2 * | 9/2020 | Xu | ...................... H02P 21/0089 |
| 10,840,841 | B2 * | 11/2020 | Xu | ......................... H02P 21/141 |
| 11,258,390 | B2 * | 2/2022 | Xu | .......................... H02P 21/12 |
| 2017/0057360 | A1 * | 3/2017 | Murthy | .............. B60L 15/2009 |
| 2019/0028003 | A1 * | 1/2019 | Seith | ...................... H02K 21/12 |
| 2021/0028732 | A1 * | 1/2021 | Xu | .......................... H02P 21/12 |
| 2022/0324085 | A1 * | 10/2022 | Nakahara | ............... B25F 5/001 |

FOREIGN PATENT DOCUMENTS

| | | |
|---|---|---|
| EP | 3872978 A1 | 12/2022 |
| EP | 3750670 A1 | 3/2023 |

* cited by examiner

*Primary Examiner* — Thai T Dinh

(74) *Attorney, Agent, or Firm* — Greenberg Traurig, LLP

(57)     ABSTRACT

A power tool includes: a motor including a rotor and multiple phases of stator windings; and a control circuit configured to control the working state of the motor. The control circuit includes: a driver circuit including multiple switching elements; a controller electrically connected to at least the driver circuit and capable of outputting a control signal to change the conducting states of the multiple switching elements in the driver circuit; and a parameter detection module configured to detect a working parameter of the motor. In response to a braking signal, the controller sets an input parameter of the control circuit according to a preset parameter and the working parameter to control output power of the motor and/or output torque of the motor, thereby controlling the motor to brake.

16 Claims, 6 Drawing Sheets

POWER TOOL

This application claims the benefit under 35 U.S.C. § 119(a) of Chinese Patent Application No. 202210830212.7, filed on Jul. 15, 2022, which application is incorporated herein by reference in its entirety.

BACKGROUND

When a tool with a permanent-magnet synchronous motor brakes, the motor generally generates a relatively large voltage spike or a reverse bus current. If the withstand voltage of a bus capacitor or the withstand voltage of a driving transistor is exceeded, a device is damaged. In addition, the reverse bus current has a certain impact on a power supply, causing the power supply to fail to work. A common solution is that resistors with great resistance are connected in parallel at two ends of the bus capacitor and the current is consumed by the bleeder resistors during braking. This method requires additional bleeder resistors and control circuits, increasing a certain cost and space.

SUMMARY

A power tool includes: a motor including a rotor and multiple phases of stator windings; and a control circuit configured to control the working state of the motor. The control circuit includes: a driver circuit including multiple switching elements; a controller electrically connected to at least the driver circuit and capable of outputting a control signal to change the conducting states of the multiple switching elements in the driver circuit; and a parameter detection module configured to detect a working parameter of the motor. In response to a braking signal, the controller sets an input parameter of the control circuit according to a preset parameter and the working parameter to control output power of the motor and/or output torque of the motor, thereby controlling the motor to brake.

In an example, the control circuit is a field-oriented control (FOC) control circuit.

In an example, the preset parameter includes the maximum current and/or the maximum voltage which the control circuit or the motor is capable of withstanding; and the working parameter includes a bus voltage and/or a bus current and/or a rotational speed of the motor.

In an example, the input parameter of the control circuit includes a direct axis input parameter and a quadrature axis input parameter; and each of the direct axis input parameter and the quadrature axis input parameter is a negative value.

In an example, the sum of the square of the direct axis input parameter and the square of the quadrature axis input parameter is equal to the square of a preset current.

In an example, braking time of the motor is less than or equal to 3 seconds.

A power tool includes: a motor including a rotor and multiple phases of stator windings; and a control circuit configured to control the working state of the motor. The control circuit includes: a driver circuit including multiple switching elements; a controller electrically connected to at least the driver circuit and capable of outputting a control signal to change the conducting states of the multiple switching elements in the driver circuit; and a parameter detection module configured to detect a working parameter of the motor. In response to a braking signal, the controller adjusts an input parameter of the control circuit to control output power of the motor and/or output torque of the motor, thereby controlling the motor to brake.

In an example, the control circuit is a FOC control circuit.

In an example, braking time of the motor is less than or equal to 3 seconds.

A power tool includes: a motor including a rotor and multiple phases of stator windings; and a control circuit configured to control the working state of the motor. The control circuit includes: a driver circuit including multiple switching elements; a controller electrically connected to at least the driver circuit and capable of outputting a control signal to change the conducting states of the multiple switching elements in the driver circuit; and a parameter detection module configured to detect a working parameter of the motor. The control circuit includes at least: a current loop circuit capable of controlling, based on a preset current parameter and a current parameter fed back by the motor, the motor to perform current control; and a speed loop circuit capable of determining the preset current parameter based on a preset speed parameter and a rotational speed parameter fed back by the motor. In response to a braking signal, the controller is capable of adjusting the preset current parameter to control output power of the motor and/or output torque of the motor, thereby controlling the motor to brake.

The present application has the following benefit: the power tool can brake safely and fast without providing additional electronic elements.

DETAILED DESCRIPTION

Figure 1:
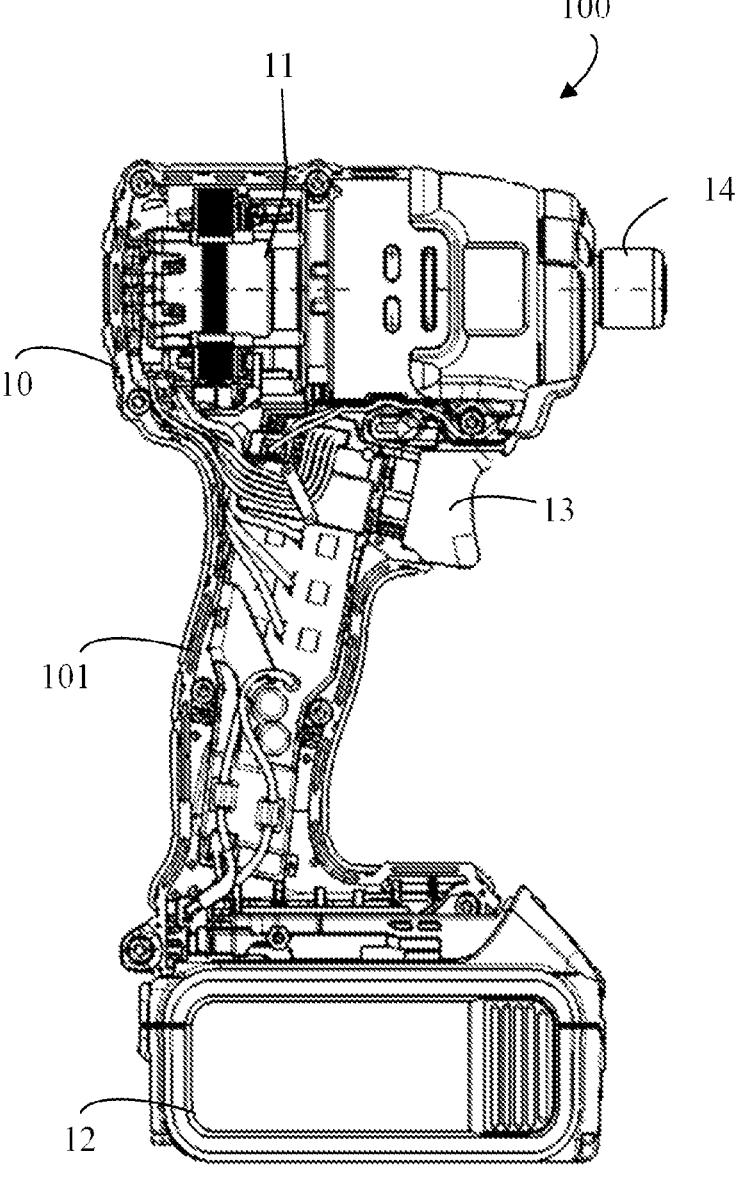
FIG. 1 is a structural view of a power tool in an example of the present application.

The present application is described below in detail in conjunction with drawings and examples. It is to be understood that the examples described herein are intended to explain the present application and not to limit the present application. Additionally, it is to be noted that to facilitate description, only part, not all, of structures related to the present application are illustrated in the drawings.

Unless otherwise defined, all technical and scientific terms used herein have the same meanings as those commonly understood by those skilled in the art to which the present application pertains. Terms used in the specification of the present application are only used for describing the examples and not intended to limit the present application. The term "and/or" used herein includes any or all combinations of one or more listed associated items.

Power tools to which the technical solutions of the present application are applicable include handheld power tools, fastening power tools, cutting power tools, polishing power tools, garden power tools, and the like, for example, an electric drill, an electric circular saw, a reciprocating saw, a miter saw, an impact wrench, an impact screwdriver, a hammer drill. Other types of power tools which can adopt the substance of the technical solutions disclosed below may fall within the scope of the present application. The electric drill is used as an example for description in the present application, and other types of power tools are not introduced one by one.

Referring to a power tool shown in FIG. 1, a power tool 100 includes at least a housing 10, a motor 11 in the housing, a power supply 12, an operation switch 13, a working head 14, and the like. The motor, a control circuit board, and a transmission structure (not shown) are disposed in the housing 10. The housing 10 is also formed with a grip 101 for a user to hold. The operation switch 13 may be operated by the user to turn on or off the machine. For example, the operation switch 13 may be turned on through the operation of the user such that the power tool 100 may be controlled to be turned on, and the operation switch 13 may be turned off through the operation of the user such that the power tool 100 may be controlled to be turned off or brake.

Figure 2:
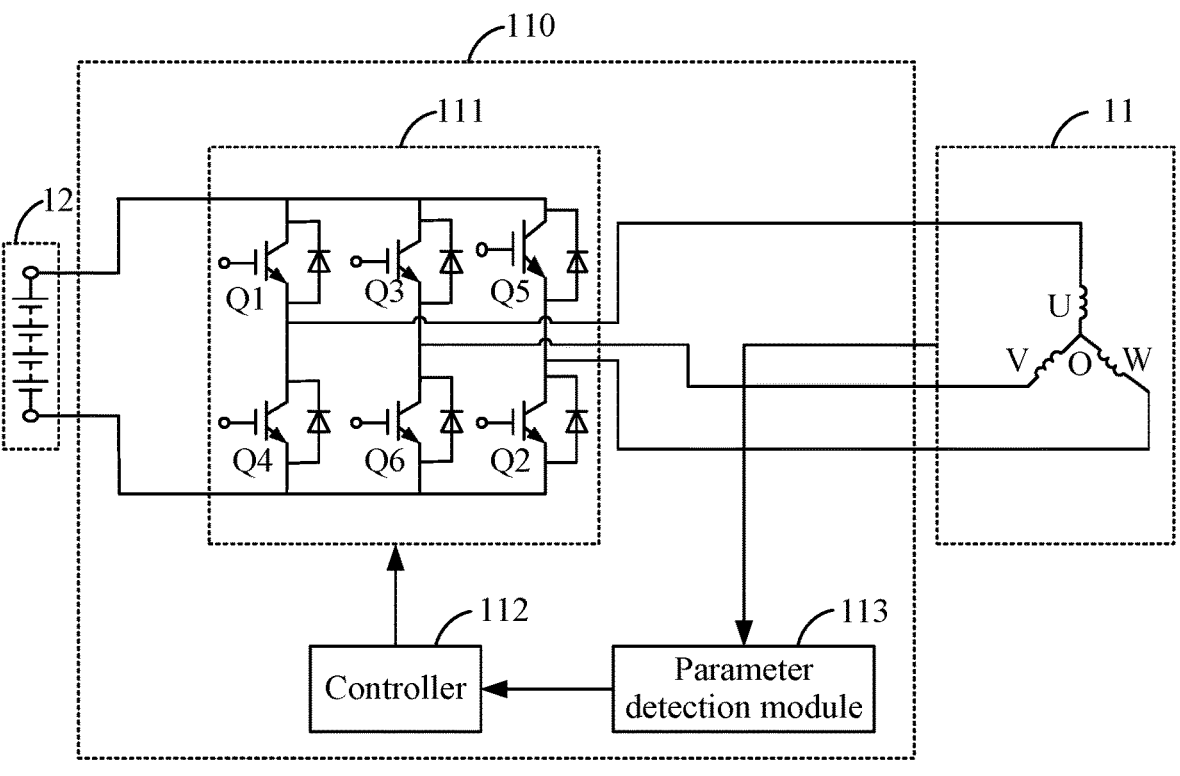
FIG. 2 is a circuit diagram of a control system of a power tool in an example of the present application.

Referring to a circuit block diagram of the power tool shown in FIG. 2, a driving system of the motor 11 may include at least the power supply 12 and a control circuit 110, where the control circuit 110 may include a driver circuit 111, a controller 112, and a parameter detection module 113. The control circuit 110 can control the working state of the motor 11. For example, the control circuit 110 can control the start, braking, rotational speed, rotational direction, output torque, and output power of the motor 11.

In an example, the motor 11 is a brushless direct current motor (abbreviated as a BLDC). In an example, the motor 11 is a non-inductive BLDC. In an example, the motor 11 is an inductive BLDC. In an example, motor 11 is the inductive BLDC. In this example, the motor 11 may be an inrunner motor or an outrunner motor, and three phases of stator windings A, B, and C of the motor 11 may form a star connection or a triangular connection.

In an example, the power supply 12 may optionally be an alternating current (AC) power supply, that is, AC mains of 120 V or 220 V may be accessed through a power interface. In an example, the power supply 12 may optionally be a battery pack. The battery pack may be composed of a group of battery cells. For example, the battery cells may be connected in series into a single power supply branch to form a 1P battery pack. The output voltage of the battery pack may be changed by a specific power supply control module such as a DC-DC module such that a power supply voltage suitable for the control circuit 110, the motor 11, and the like is outputted to power them up. It is to be understood by those skilled in the art that the DC-DC module is a mature circuit structure and may be selected accordingly depending on the specific parameter requirements of the power tool.

As shown in FIG. 2, the driver circuit 111 is electrically connected to the stator windings A, B, and C of the motor 11 and used for transmitting a current from the power supply 12 to the stator windings A, B, and C to drive the motor 11 to rotate. In an example, the driver circuit 111 includes multiple switching elements Q1, Q2, Q3, Q4, Q5, and Q6, where Q1, Q3, and Q5 are high-side switching elements, and Q2, Q4, and Q6 are low-side switching elements. Any phase of the stator windings of the motor 11 is connected to a high-side switching element and a low-side switching element. The gate terminal of each switching element in the driver circuit 111 is electrically connected to the controller 112 and is used for receiving a control signal from the controller 112, where the control signal may be a pulse-width modulation (PWM) signal. The drain or source of each switching element is connected to the stator windings A, B, and C of the motor 11. The switching elements Q1 to Q6 receive control signals from the controller 112 to change respective conducting states, thereby changing a current loaded on the stator windings A, B, and C of the motor 11 by the power supply 12. In an example, the driver circuit 111 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches such as the IGBTs or the BJTs.

To drive the motor 11 to rotate, the driver circuit 111 has multiple driving states, and the motor 11 may have different rotational speeds or different rotational directions in different driving states. In an example, the driver circuit 111 typically has at least six driving states, and each switching of a driving state corresponds to one commutation action of the motor. In an example, the controller 112 may output a PWM control signal to control the driver circuit 111 to switch the driving state, thereby changing the working state of the motor 11.

The parameter detection module 113 can detect a working parameter of the motor 11. For example, the parameter detection module 113 can detect a working current, a working voltage, a rotor position, a motor temperature, or the like of the motor 11. The parameter detection module 113 may be a set of multiple detection units or may be a detection unit having multiple detection functions. The specific structure or the type of the parameter detection module 113 is not limited in this example. In this example, the parameter detection module 113 can output a detected parameter to the controller 112 so that the controller 112 can adjust the working state of the motor 11 according to the working parameter of the motor 11.

In this example, the user may trigger the operation switch 13 such that a braking signal is generated. The controller 112 can change an input parameter of the control circuit 110 in response to the braking signal to change the strength of a magnetic field in the motor 11, for example, the strength of a rotor magnetic field and/or a stator magnetic field, thereby implementing the braking of the motor 11. The input parameter of the control circuit 110 may be a parameter which is preset by the user and can affect the rotation state of the motor 11. In this example, an input parameter of the control circuit 110 when the motor 11 works normally is different from an input parameter of the control circuit 110 during the braking of the motor 11. For example, during the normal work of the motor 11, the input parameter of the control circuit 110 may be a preset fixed parameter or a parameter which varies according to a preset rule; and when the motor 11 brakes and during the braking, the input parameter may be another set fixed parameter or may be a parameter which can vary with a working parameter when the motor 11 brakes.

When the motor 110 brakes, the input parameter of the control circuit 110 is changed and the strength of the magnetic field in the motor 11 is changed so that a current generated when the motor 11 brakes can be consumed through the windings of the motor and no reverse charge current is generated. Braking control can be implemented without adding elements which consume a braking current.

Figure 3:
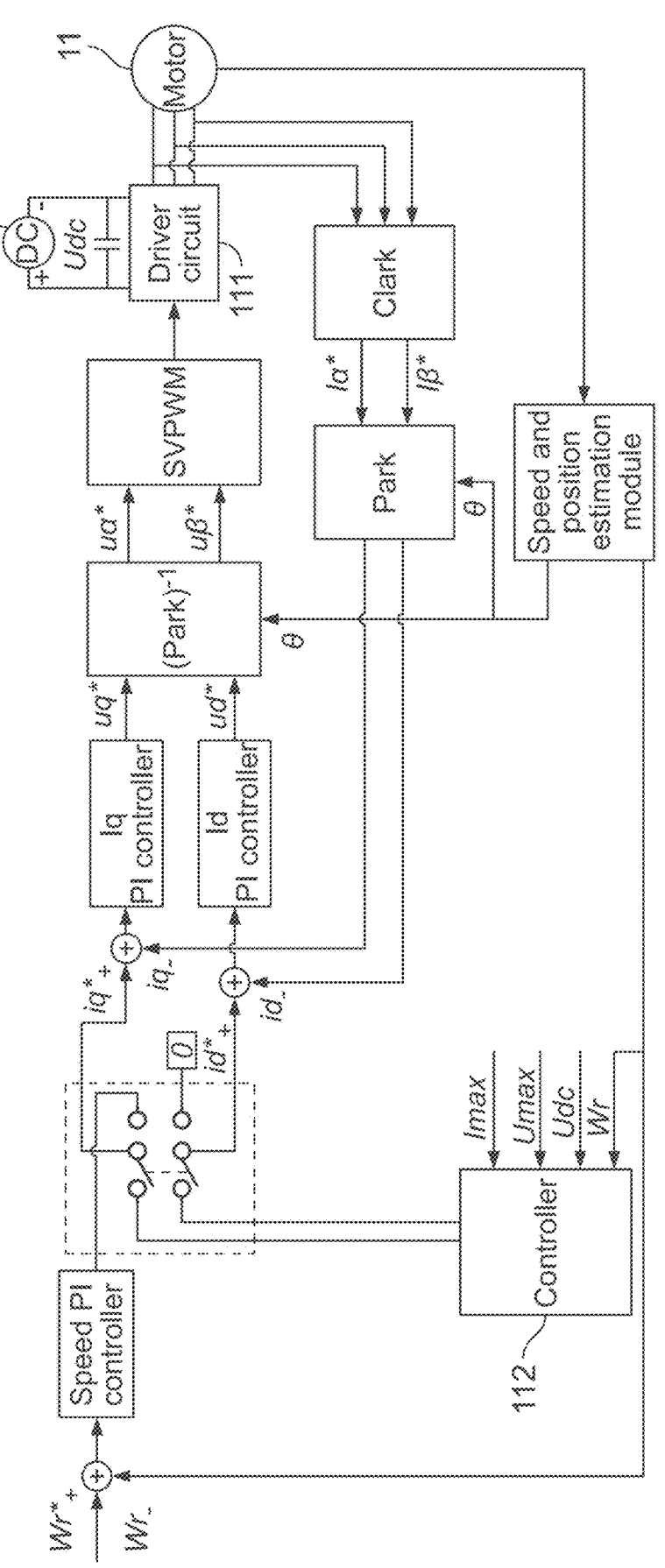
FIG. 3 is a circuit diagram of a FOC control system of a power tool in an example of the present application.

In an example, the control circuit 110 may be a FOC control circuit. Referring to FIG. 3, the FOC control circuit may include at least a current loop circuit, a speed loop circuit, and a position loop circuit certainly. The preceding three types of closed-loop control circuits are basic circuits constituting the FOC control circuit, and the FOC control circuit is not described in detail in this example. Briefly, the current loop circuit includes two loops, a quadrature axis (that is, a q axis) and a direct axis (that is, a d axis), and each loop has two input parameters, where one of the two input parameters includes preset current parameters iq* and id*, and one of the two input parameters includes current parameters iq and id of the motor 11 collected by the parameter detection module 113. The speed loop circuit can affect the input parameters of the current loop circuit. That is to say, the speed loop circuit adds a PI loop in front of the current loop circuit so that the input parameters, that is, iq* and id*, in the current loop circuit are obtained according to a preset speed parameter and an actual rotational speed parameter of the motor. Thus, the current loop circuit and the speed loop circuit can constitute a double closed-loop control of a speed and a current. Actually, as shown in FIG. 3, the parameter detection module 113 specifically includes a speed and position estimation module capable of estimating or directly detecting the rotational speed or rotor position of the motor 11, a sampling resistor (not shown) can directly collect a phase current of the motor 11, and after Clark transformation and Park transformation is performed on the collected phase current, the current parameters iq and id are obtained.

Generally, during the normal work of the motor 11, the preset current parameter iq* in the current loop circuit is a preset positive current parameter, and since a direct axis current generates no output force to drive the motor to rotate, id* is typically set to zero. During the braking of the motor 11, the three phases of windings of the motor may be controlled to be short-circuited so that the motor brakes. However, when the motor brakes in the conventional manner of a three-phase short circuit, there are problems such as a relatively high bus voltage and a reverse flow of a bus current. If the withstand voltage value of a bus capacitor or the withstand voltage value of a power element in the control circuit is exceeded, devices are easily damaged, and the reverse current causes an AC adapter to fail to work.

In order to solve the preceding problems, the controller 112 may regulate the input parameter of the control circuit 110. In an example, the controller 112 may control at least the input parameter of the current loop circuit, that is, the preset current parameter, to control the output power and/or output torque of the motor 11 so that power-controllable braking control is implemented.

In an example, in response to the braking signal, the controller 112 may set the input parameter of the control circuit 110 according to a preset parameter and a real-time working parameter of the motor 11. In an example, the preset parameter may be the maximum current and/or the maximum voltage which electronic elements in the control circuit 110 can withstand, may be the maximum current and/or the maximum voltage which the motor 11 can withstand, or may be an adaptive current and an adaptive voltage which does not exceed the maximum withstand voltage of the control circuit or the motor. In summary, the preset parameter is any value in a range not more than the maximum current and/or the maximum voltage which the control system of the power tool can withstand and not less than a working voltage and a working current during normal running. In an example, the working parameter of the motor mainly includes a bus voltages Udc and/or a bus current Idc in the control circuit and/or the rotational speed Wr of the motor. In this example, the controller 112 may change the value of a quadrature axis input parameter iq* and the value of a direct axis input parameter id* according to the preceding preset parameter and the preceding working parameter of the motor. A sum of a square of the direct axis input parameter and a square of the quadrature axis input parameter is equal to a square of the maximum current In an example, iq* and id* are both negative values. In an example, the controller 112 may control the original speed loop circuit to be off and may input the redetermined input parameters iq* and id* into the current loop circuit. In an example, a control manner in which the controller 112 turns off the original speed loop may be implemented through software control.

In this example, the input parameters iq* and id* of the current loop circuit are controlled so that the bus current or the bus voltage in the control circuit 110 can be affected. Thus, the object to control the output torque or output power of the motor is achieved so that it can be ensured that the braking current can be consumed in the windings of the motor and cannot be reversely fed back to the power supply.

In an example, the controller 112 may accurately control the quadrature axis input parameter iq* and the direct axis input parameter id* in the FOC control circuit according to the rotational speed of the motor in the preset parameter. In this example, iq* whose value is negative is provided so that negative electromagnetic torque can be generated and the motor brakes; and id* whose value is negative is provided so that the magnetic field of the windings can be weakened, a winding current is increased, copper loss is increased, and it can be ensured that the braking current does not return to the power supply during the braking of the motor.

In this example, the controller 112 may change braking time of the motor according to the maximum current Imax in the preset parameter. For example, the stronger the set maximum current Imax, the shorter the braking time, and vice versa. In order to obtain suitable braking time, different maximum currents may be set according to specific working conditions of the tool. In an example, the power tool may have multiple working conditions, and different working conditions correspond to the different maximum currents so that different braking time is obtained. The controller may select a corresponding maximum current according to the working condition of the tool, thereby adaptively changing the braking time of the motor. In this example, the braking time of the motor is less than or equal to 3 seconds. In an example, the braking time of the motor is less than or equal to 4 seconds. In an example, the braking time of the motor is less than or equal to 5 seconds. In an example, the braking time of the motor is less than or equal to 2 seconds.

Figure 4A:
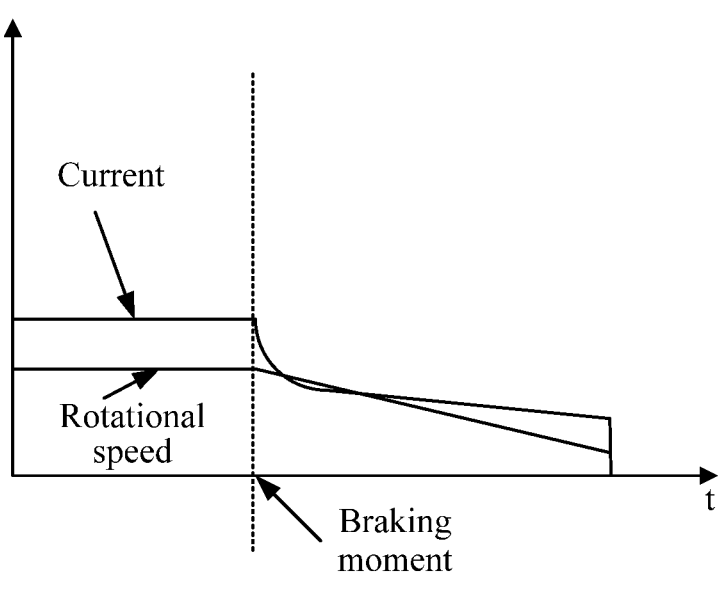
FIG. 4A is a schematic diagram showing a variation of the rotational speed of a motor and a variation of a current in the process where the motor brakes in the existing art.
Figure 4B:
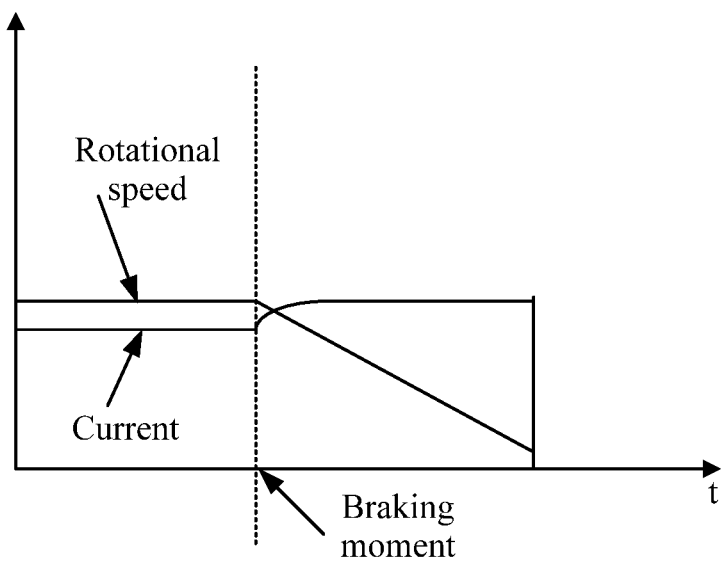
FIGS. 4B and 4C are schematic diagrams showing variations of the rotational speed of a motor and variations of a current in the process where the motor brakes in an example of the present application.
Figure 4C:
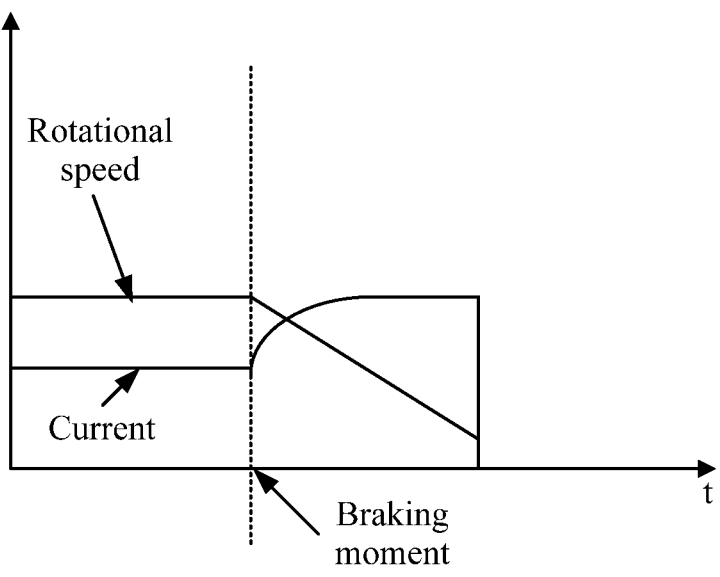
Figure 5A:
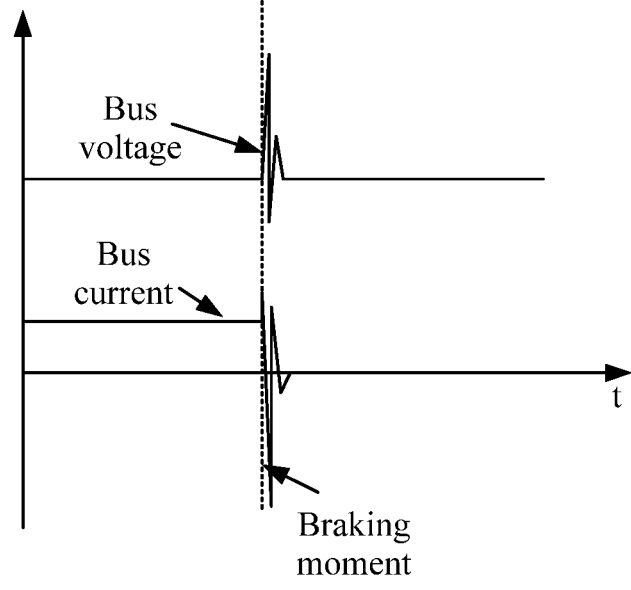
FIG. 5A is a schematic diagram showing a variation of a bus current and a variation of a bus voltage in the process where the motor brakes in the existing art.
Figure 5B:
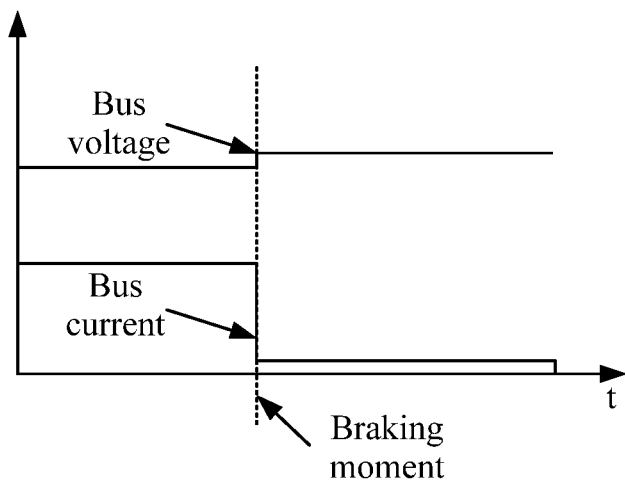
FIG. 5B is a schematic diagram showing a variation of a bus current and a variation of a bus voltage in the process where the motor brakes in an example of the present application.

In an example, FIG. 4A shows a variation of the rotational speed of the motor and a variation of the current in the process in which the motor brakes with three-phase short-circuited motor windings, and FIGS. 4B and 4C show a variation of the rotational speed of the motor and a variation of the current in the process in which the motor is controlled, with the technical solutions protected by examples of the present application, to brake. FIG. 5A shows a variation of the bus current and a variation of the bus voltage in the process where the motor brakes with the three-phase short-circuited motor windings, and FIG. 5B shows a variation of the bus current and a variation of the bus voltage in the process where the motor is controlled, with the technical solutions protected by the examples of the present application, to brake. It can be seen by comparing FIGS. 4A to 5B that when the braking is performed through the reduction of the braking current in the existing art, the braking time is relatively long, and a relatively large bus voltage spike and a relatively large reverse bus current spike exist during the braking; and in the process where the motor brakes with this solution, the maximum current Imax is set so that the input parameters of the current loop circuit are controlled and the output energy consumption of the motor 11 is controlled such that the motor brakes, the motor takes a relatively short time to brake, and the larger the maximum current, the faster the motor brakes and decelerates, and the shorter the braking time of the motor. The maximum voltage Umax is set so that the bus voltage is controlled to not exceed the set voltage. Thus, the bus voltage spike and the reverse bus current spike do not exist during the braking.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A power tool, comprising:
a motor comprising a rotor and a plurality of phases of stator windings; and
a control circuit configured to control a working state of the motor;
wherein the control circuit comprises:
a driver circuit comprising a plurality of switching elements;
a controller electrically connected to the driver circuit and capable of outputting a control signal to change conducting states of the plurality of switching elements in the driver circuit; and
a parameter detection module configured to detect a working parameter of the motor;
wherein the control circuit comprises:
a current loop circuit configured to control, based on a preset current parameter and a current parameter fed back by the motor, the motor to perform current control, wherein the preset current parameter of the current loop circuit comprises a direct axis input parameter and a quadrature axis input parameter;
wherein the controller is configured to:
in response to a braking signal, set the preset current parameter of the current loop circuit according to a preset parameter and the working parameter to control output power of the motor and/or output torque of the motor, thereby controlling the motor to brake;
wherein the preset parameter is lower than or equal to a maximum current which the control circuit or the motor is configured to withstand, and a sum of a square of the direct axis input parameter and a square of the quadrature axis input parameter is equal to a square of the maximum current.

2. The power tool according to claim 1, wherein the control circuit is a field-oriented control (FOC) circuit.

3. The power tool according to claim 1, wherein the working parameter comprises a bus voltage and/or a bus current and/or a rotational speed of the motor.

4. The power tool according to claim 3, wherein the controller is configured to change braking time of motor braking according to the maximum current in the preset parameter.

5. The power tool according to claim 4, wherein the maximum current in the preset parameter is negatively correlated with the braking time.

6. The power tool according to claim 3, wherein the controller is configured to set the maximum current according to a working condition of the power tool to obtain different braking time.

7. The power tool according to claim 1, wherein the preset parameter is not lower than a working voltage and/or a working current when the power tool works normally.

8. The power tool according to claim 1, wherein each of the direct axis input parameter and the quadrature axis input parameter is a negative value.

9. The power tool according to claim 1, wherein braking time of the motor is less than or equal to 3 seconds.

10. The power tool according to claim 1, wherein the motor is a brushless direct current motor.

11. The power tool according to claim 1, wherein the motor is an inrunner motor.

12. The power tool according to claim 1, wherein the motor is an outrunner motor.

13. A power tool, comprising:
a motor comprising a rotor and a plurality of phases of stator windings; and
a control circuit configured to control a working state of the motor;
wherein the control circuit comprises:
a driver circuit comprising a plurality of switching elements;
a controller electrically connected to the driver circuit and capable of outputting a control signal to change conducting states of the plurality of switching elements in the driver circuit; and
a parameter detection module configured to detect a working parameter of the motor;
wherein the control circuit includes:
a current loop circuit configured to control in, based on a preset current parameter and a current parameter fed back by the motor, the motor to perform current control, wherein the preset current parameter of the current loop circuit comprises a direct axis input parameter and a quadrature axis input parameter;
wherein the controller is configured to:
in response to a braking signal, adjust the preset current parameter of the current loop circuit according to a preset parameter and the working parameter to control output power of the motor and/or output torque of the motor, thereby controlling the motor to brake;
wherein the preset parameter is lower than or equal to a maximum voltage which the control circuit or the motor is configured to withstand so that the bus voltage spike and the reverse bus current spike do not exist during the braking, and a sum of a square of the direct axis input parameter and a square of the quadrature axis input parameter is equal to a square of the maximum current.

14. A power tool, comprising:
a motor comprising a rotor and a plurality of phases of stator windings; and
a control circuit configured to control a working state of the motor;
wherein the control circuit comprises:
a driver circuit comprising a plurality of switching elements;
a controller electrically connected to the driver circuit and capable of outputting a control signal to change conducting states of the plurality of switching elements in the driver circuit; and
a parameter detection module configured to detect a working parameter of the motor;

wherein the control circuit comprises at least:

a current loop circuit capable of controlling, based on a preset current parameter and a current parameter fed back by the motor, the motor to perform current control; and a speed loop circuit capable of determining the preset current parameter based on a preset speed parameter and a rotational speed parameter fed back by the motor; and wherein, in response to a braking signal, the controller is capable of adjusting the preset current parameter according to a preset parameter and the working parameter to control output power of the motor and/or output torque of the motor, thereby controlling the motor to brake;

wherein the power tool has multiple working conditions, different working conditions correspond to the different maximum currents, and the preset parameter is set as one of the different maximum currents according to the multiple working conditions so that the power tool adaptively changes a braking time according to the multiple working conditions.

15. The power tool according to claim 14, wherein the preset current parameter is not lower than a working current when the power tool works normally.

16. The power tool according to claim 14, wherein braking time of the motor is less than or equal to 3 seconds.

\* \* \* \* \*